Patented Apr. 18, 1933

1,903,768

UNITED STATES PATENT OFFICE

PAUL S. KENNEDY, OF NEWARK, NEW JERSEY, ASSIGNOR TO MURPHY VARNISH COMPANY, OF NEWARK, NEW JERSEY, A CORPORATION OF NEW JERSEY

WOOD FILLER AND RELATED MATERIALS

No Drawing.   Application filed November 12, 1929.   Serial No. 406,723.

This invention relates to fillers for wood surfaces and articles, and filler coatings and coating compositions adapted for use on wood, metal and other surfaces.

The type of wood filler now commonly employed in the art invariably depends for its vehicle ingredients on either a drying vegetable oil, such as linseed or tung oil, a varnish, or a japan, or some combination of these three types of materials. All of these materials oxidize, their very use depending on such oxidation or chemical change in the vehicle. Due to this varied chemical change or oxidation, these materials do not form a good bond between the filler composition and a superposed coating such as lacquer, so that it is usually necessary to employ an insulating coat of some kind to overcome this lack of bond. The insulating coat usually is of an inactive nature, such as shellac. Without an insulating coat of this character, the article coated with these prior art coatings is likely to show a graying effect in the finished film, which graying effect may occur almost immediately or after a period of months. Such graying effect frequently results in a very unsightly finish, destroying the clarity of the finishing material film. In any event, a poor bond is almost certain to result, making the otherwise tough film tender.

Among the objects and advantages of the present invention is the production of filler compositions including pigments and vehicles, which vehicles provide a coating of the necessary elasticity, are not active chemically after application, and provide excellent bonding agents with superposed coatings, such as lacquers, particularly those containing nitrocellulose.

Other objects and advantages will appear from the more detailed description set forth below, it being understood however that this more detailed description is given by way of explanation only and not by way of limitation, since various changes therein may be made by those skilled in the art without departing from the scope and spirit of the present invention.

In preparing the filler compositions according to the present invention, solutions of synthetic resins are employed, and particularly solutions of the synthetic resins of the rezyl type. The use of such rezyls or solutions of these rezyls eliminates the difficulties exhibited in the utilization of the prior art vehicles referred to above. The rezyls are particularly valuable in connection with the present invention, and represent a class of synthetic resins that have recently appeared on the market. A rezyl is a resin produced from a polyhydric alcohol such as glycerol, a polybasic acid such as phthalic acid, and a fatty oil component such as the fatty acids derived from oils. The following example is illustrative of one of the rezyls:

|   | Pounds |
|---|---|
| Phthalic anhydride | 80 |
| 98% glycerol | 50 |
| Distilled fatty acids of cottonseed oil (commercially known as "Beta Fat") | 45 |

These materials may be heated together at a temperature of between 450 and 475° F. until a sample on cooling shows the acid number to be less than twenty-five, and the ball and ring melting point to be approximately 62° C. While this particular rezyl has given excellent results in connection with the present invention, it is understood, of course, that any of the other rezyls or analogous materials may be utilized in producing the fillers of the present invention.

The particular rezyl chosen, such as that set forth above, may then be thinned with a solvent. A coal tar hydrocarbon having a boiling point range of from 165 to 175° C. may desirably be used in this connection. For example, such a coal tar hydrocarbon may be utilized to dissolve the particular rezyl set forth above in the proportion of 1 gallon of the solvent to 3 pounds of the resin.

The proportions of gum to solvent can be altered within quite wide limits, but the ratio given above is particularly useful in connection with wood fillers. Other solvents or diluents or vehicles may be utilized together with the synthetic resins of the rezyl type, such additional solvents including ethyl benzene, and other derivatives of coal tar distillation. For best results, it is desirable that the solvent utilized have a high boiling point and that it evaporate clean. Composite solvents including the coal tar distillation materials, together with turpentine and petroleum distillates may also be used. Some of these materials however exhibit a tendency to raise the viscosity of the solution, and are, therefore, not as desirable as that mentioned in the preferred example.

By way of illustration, the following is exemplary of a wood filler composition made in accordance with the present invention:

4 lbs. of wood flour
    22 lbs. of floated silex
    ½ lb. of red iron oxide
    ¼ lb. of lamp black
    1¼ gals. of a solution made by dissolving three pounds of suitable rezyl in one gallon of a suitable coal tar hydrocarbon.

These materials may be intermixed in any desired manner, and the product thus obtained is a particularly valuable wood filler composition.

The red iron oxide and lamp black given in the formula above, are merely for the purpose of coloring the composition, and may be substituted by any other desired pigments. Further the proportions given in the wood filler composition set forth above are not to be taken as limiting, since these proportions can be varied within wide limits to give different colors, different filling properties and different periods of drying before being rubbed, to be wiped off the work as is the practice in filling wood.

Other materials may be substituted for or used in conjunction with the silex or wood flour, among which substances there may be mentioned gypsum, cornstarch, china clay, infusorial earth, chalk, asbestine and magnesia. The latter two for example have been used in admixture with other pigments to improve suspension properties in certain formulas and are preferably used in this manner rather than as the major ingredient.

As exemplary of another type of filler and pigment mixture that may be used with the rezyl solution set forth above, the following is given:

|  | Pounds |
|---|---|
| Wood flour | 4 |
| Gypsum | 15 |
| Floated silex | 7 |

Many combinations of the materials set forth above have been utilized in preparing filler compositions in accordance with the present invention. While silex is particularly useful in such compositions, it is not an essential ingredient, and compositions have been made employing, for example, a mixture of gypsum and cornstarch without silex.

The setting time of the filler composition is particularly important from the practical standpoint. The rate of setting can be desirably controlled by variations in the amount of the wood flour, for example. The more wood flour, for example, in the composition, the slower is the setting time of the filler before being wiped off in accordance with the usual practice. In the composition set forth above, the wood flour is deliberately employed for the purpose of slowing the setting time, and the proportions given in the examples above yield wood filler compositions having very desirable setting times for actual practical use.

Nitrocellulose or other lacquers applied over fillers of the type set forth above show a substantially perfect bond or adhesion between the layers or coatings, whereas similar lacquers applied over the various standard brands of filler now available on the market are most unsatisfactory. Furthermore, the fillers of the present invention result in elimination of the graying effect referred to above, and the expense entailed by the use of insulating coats is also avoided.

Fillers produced in accordance with the present invention are particularly desirably used under nitrocellulose coatings, both on wood or metal and other surfaces. In these cases the wood flour is not necessarily used, and the pigments may vary widely. The vehicle would be the solution of the rezyl, but the pigment might, for example, be mixtures of such pigments as keystone filler, china clay, chalk, slate, soapstone, lithopone, lead and rottenstone, etc.

Fillers produced in accordance with the present invention are an outstanding advance in the art, because they will bond directly with nitrocellulose compositions, and this is particularly important when such compositions are used on wood since the compositions produced in accordance with the present invention exhibit sufficient elasticity to conform to the natural working of the wood, and in addition are relatively inactive chemically.

Having thus set forth my invention, I claim:

A wood article carrying a filling coating composition consisting of a polyhydric alcohol-polybasic acid-oil acids resin, a wood filler, and a cellulose ester overcoat.

PAUL S. KENNEDY.